United States Patent [19]
Kligerman

[11] 3,980,210
[45] Sept. 14, 1976

[54] MEASURING AND DISPENSING DEVICE FOR FLUENT MATERIAL

[76] Inventor: Alan E. Kligerman, 3540 Atlantic Ave., Atlantic City, N.J. 08404

[22] Filed: Mar. 24, 1975

[21] Appl. No.: 561,610

[52] U.S. Cl................................. 222/456; 222/530
[51] Int. Cl.² ........................................ G01F 11/26
[58] Field of Search.............. 222/478, 456, 457.5, 222/528, 530, 531, 565

[56] References Cited
UNITED STATES PATENTS

| | | | |
|---|---|---|---|
| 834,014 | 10/1906 | Lyke | 222/456 |
| 900,644 | 10/1907 | Baeyer | 222/456 |
| 1,026,828 | 5/1912 | Pierce | 222/530 X |
| 1,282,900 | 10/1918 | Mason | 222/456 X |
| 1,927,149 | 9/1933 | Belefont | 222/565 X |
| 2,957,614 | 10/1960 | Krajcovic | 222/530 X |
| 3,107,031 | 10/1963 | Adams | 222/456 X |

Primary Examiner—Robert B. Reeves
Assistant Examiner—David A. Scherbel
Attorney, Agent, or Firm—Robert K. Youtie

[57] ABSTRACT

A container having bottom, top and side walls for fluent contents, a tubular exit member extending internally of the container along one region of the side wall with a lower internal tubular extension along the bottom wall and an upper tubular extension through and exteriorly of the top wall, the upper tubular extension being swingable to overlie the top wall.

5 Claims, 4 Drawing Figures

MEASURING AND DISPENSING DEVICE FOR FLUENT MATERIAL

BACKGROUND OF THE INVENTION

While there have, in the past, been proposed a variety of dispensing and metering devices for fluent materials, such as granular sugar and the like, these prior devices have been subject to certain disadvantages and have therefore not found general commercial acceptance. For example, prior devices of this general type have been necessarily complex in construction and difficult to manufacture, fill and assemble, unreliable in operation, and readily subject to malfunction.

SUMMARY OF THE INVENTION

It is, therefore, an important object of the present invention to provide a measuring and dispensing device of the type described which overcomes the above-mentioned difficulties, is extremely simple in construction, quickly and easily filled and assembled, relatively inexpensive to manufacture, and durable and reliable throughout a long useful life.

It is still another object of the present invention to provide a measuring and dispensing device having the advantageous characteristics mentioned in the preceding paragraph which is readily operable by unskilled persons without special training, neat and attractive in appearance for use as tableware, and which is staunch and durable in structure to effectively protect the contents throughout a long useful life.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

DESCRIPTION OF THE PREFERRED EMBODIMENT

Figure 1:
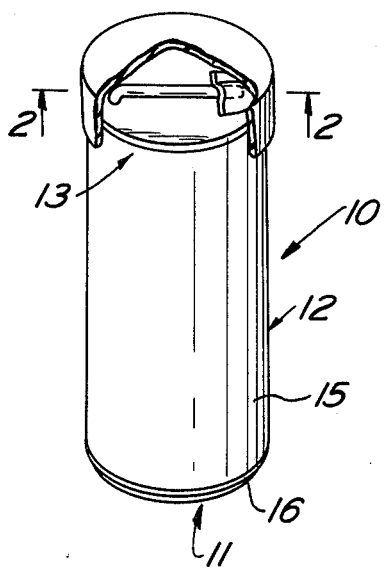
FIG. 1 is a top perspective view showing a measuring and dispensing device of the present invention, partly broken away for clarity of understanding.
Figure 2:
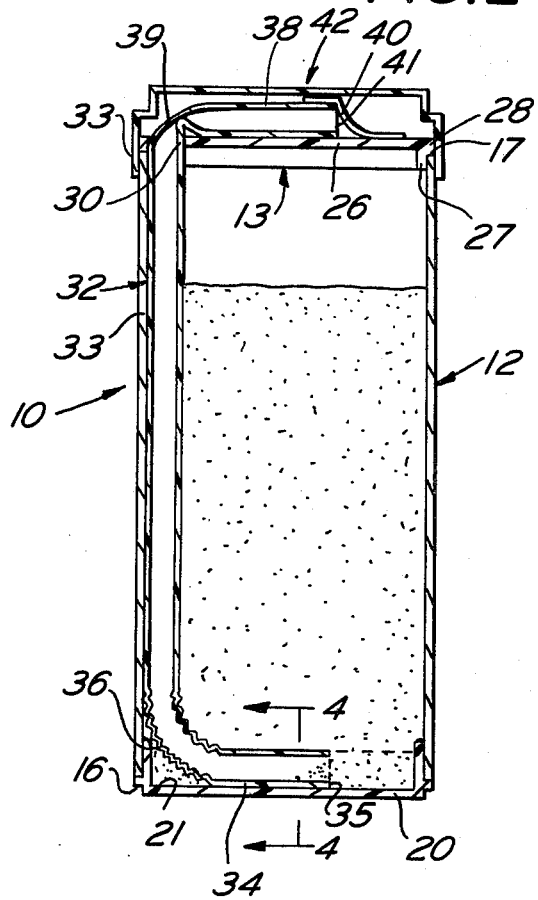
FIG. 2 is a sectional elevational view taken generally along the line 2—2 of FIG. 1.

Referring now more particularly to the drawings, and specifically to FIGS. 1 and 2 thereof, a container is there generally designated 10 and may generally include a bottom wall 11, a circumferential side wall 12 upstanding from the bottom wall, and a top wall 13 extending across and in closing relation with respect to the upper end of side wall 12.

More specifically, the side wall 12 may be defined by a generally hollow, open-ended tube or cylinder 15, say of cardboard, plastic or other suitable material, having a generally circular lower end or edge 16 lying in a plane transverse of or normal to the axis of the cylindrical side wall 15. The upper end of the cylindrical tubular side wall 15 may be defined by a generally circular upper end or edge 17 also lying in a plane transverse of or normal to the axis of cylindrical side wall 15. Of course, the cylindrical exterior surface of side wall 12 affords ample space for advertising, instructive copy and the like.

Figure 3:
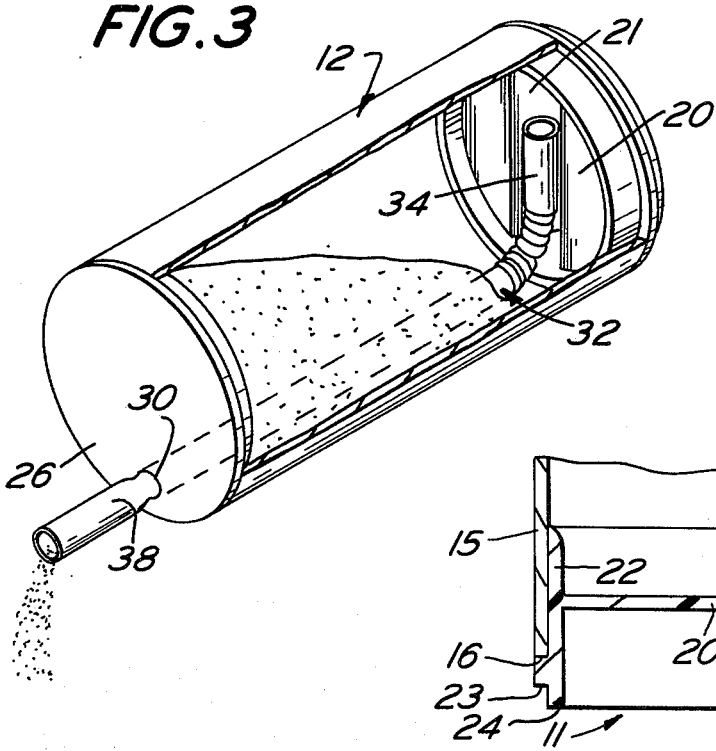
FIG. 3 is a perspective view showing the instant measuring and dispensing device in an operative condition of use, broken away to illustrate the interior.
Figure 4:
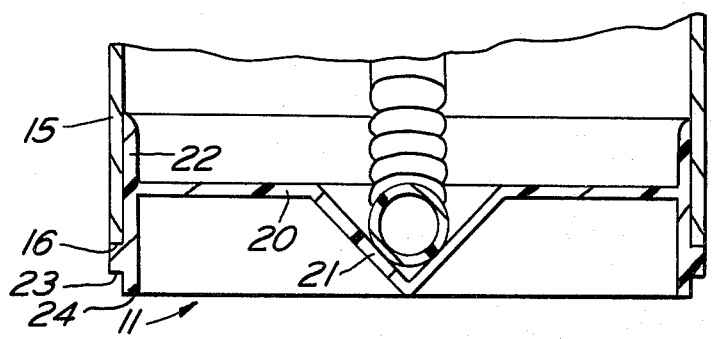
FIG. 4 is a partial sectional elevational view taken generally along the line 4—4 of FIG. 2.

The lower end or bottom wall 11 may include a generally circular disc or plate 20, which may have formed therein and extending generally chordally or diametrically thereacross an inwardly or upwardly facing recess or trough 21, best seen in FIGS. 3 and 4. Extending circumferentially about the circular wall or plate 20 and both upstanding and depending therefrom is a circumferential wall 22. Thus, the circumferential wall 22 is configured for snug conforming engagement in the lower end region of the container side wall or tube 15 with the lower end plate 20 located upwardly or inwardly past the lower end edge 16 of the container side wall. A peripheral, external rib or land 23 is provided on the circumferential wall 22, adjacent to and spaced above the lower end 24 of the circumferential wall. The rib 23 is abuttingly engageable with the container end 16 to limit inward movement of the container bottom wall 11 with the lower end edge 24 of the circumferential wall 22 exteriorly of the container side wall 15. The bottom wall 11 may be suitably formed, say integrally of plastic, as by injection molding, or otherwise as desired, and may be friction fit in the container side wall 15, adhesively secured or otherwise fastened in position.

The top wall 13 may include a generally circular top plate or disc 26 having a depending circumferential wall or flange 27. That is, the top plate or disc 26 may extend generally across the upper end of container side wall 12 with the depending flange 27 snugly engaged in the upper end region of the container side wall. A circumferential rib or shoulder 28 may be provided externally about the periphery of flange 27 and plate 26 for limiting abutting engagement with the upper end edge 17 of the container side wall 12. The top wall 13 may similarly be integrally formed of any suitable material, say of plastic by injection molding, or otherwise, and is further provided at one location adjacent to one region of side wall 12 with an aperture, opening or hole 30 through the top plate 26. In particular, the aperture or hole 30 through top wall plate 26 is located eccentrically with respect to the container 10, adjacent to one region of the container side wall 12, and is generally in alignment longitudinally of the container with one end of transverse recess or trough 21 of the bottom wall 11. That is, in the upright condition of FIG. 2, the top wall opening or hole 30 is located directly above and over one end of the bottom wall trough 21.

The top wall 13 may also be frictionally, adhesively or otherwise secured in position in the upper end region of container side wall 12.

Located essentially within the container 10 is a dispensing structure, generally designated 32. In greater detail, the dispensing structure 32 includes a longitudinally extending tubular member 33 disposed within and extending longitudinally of the container side wall 12. The tubular member 33 may be located proximate to one region of the container side wall 12, the left-hand region as seen in FIG. 2, and extend between the top wall opening 30 and the bottom wall trough 21. In practice, the dispensing structure 32 may be formed essentially of drinking straw material, or otherwise, if desired.

From the lower end region of tubular member 33, there extends a lower tube extension 34, which may also be in the nature of drinking straw material, and may rest in bottom wall trough 21. The lower tube extension 34 may have one end open, as at 35 for fluid communication with the interior of trough 21, and may have its other end integrally joined to the lower end of tubular member 33, as by a merging tube portion 36. The merging tube portion may be arcuate for smooth mergence with both the lower tube extension 34 and tubular member 33, a bellows configuration having been found satisfactory in affording smooth mergence and integral construction for efficient flow of material therethrough. As best seen in FIGS. 2 and 3, the distal, open end 35 of lower tube extension 34 terminates short of the opposite end of groove 21, so that its opening is unobstructed.

An upper tubular extension 38 is disposed exteriorly of the top wall 13 and extends snugly through the top wall hole 30 for integral connection to the upper region of tubular member 33. In its nonuse condition, the upper tubular extension 38 may be swung downwardly to extend generally radially inwardly from the hole 30 lying on the upper or outer side of top wall plate 26. This inoperative generally normal disposition of upper tubular extension 38 with respect to tubular member 33 serves to temporarily crimp and effectively close the bent tube region 39 proximate to hole 30. This crimping and closure at tube region 39 is effected without permanent deformation of the material, upward swinging of upper tubular section 38 into alignment with tubular member 33 immediately opening the previously closed region, as seen in FIG. 3.

The upper tubular extension 38 may be secured in its inoperative closing position of FIGS. 1 and 2 by any suitable means, such as a removable pressure sensitive tape 40 overlying and closing the otherwise open end 41 of the upper tubular extension. Thus, the securement patch or tape 40 serves to additionally close and seal the upper tubular extension free end 40.

Additionally, a closure cap or lid 42 may be provided with a depending circumferential wall or flange 33 for removable closing engagement over the upper end region of container 12. The closure or cap 42 serves to further protect the interior of the container 12 from contamination.

In practice, the container side wall 12 may be initially assembled together with top wall 13, dispensing structure 32 and cover 42. The lower end 16 of container side wall 12 may remain open and permit of filling therethrough, as with granular sweetener, or the like. After filling, the bottom wall 11 may be inserted in closing relation with the container side wall 12. In this condition, as shown in FIGS. 1 and 2, the container is adapted for shipment, storage and sale to the ultimate consumer. Upon initial use, it is only necessary to remove cap 42 and adhesive patch 40, and permit the upper tubular extension 38 to swing to its normal outstanding position longitudinally of the container, as shown in FIG. 3.

In this condition, tilting of the container will serve to pass a predetermined quantity of contents through the dispensing structure 32, either in a steady stream or for sprinkling, as desired. Obviously, repeated tilting as above described effects repetition of the dispensing procedure. Substantially complete emptying of the container 10 is assured by location of the lower tube extension 34 in the trough 21 for receiving substantially all of the contents.

It will now be appreciated that the device of the present invention provides for measuring and dispensing of fluent material in a manner to fully achieve the advantageous characteristics mentioned hereinbefore.

Although the present invention has been described in some detail by way of illustration and example for purposes of clarity of understanding, it is understood that certain changes and modifications may be made within the spirit of the invention.

What is claimed is:

1. A measuring and dispensing device for fluent material, said device comprising a bottom wall, a side wall extending peripherally about and upstanding from said bottom wall, a top wall extending across said side wall, said top and bottom walls combining with said side wall to define an enclosed container, said top wall having a through aperture adjacent to one region of said side wall, a tubular member extending internally of said container along said one side wall region between said bottom and top walls, a lower tube extension communicating with the lower end of said tubular member and extending along said bottom wall terminating in an open end spaced from said one side wall region, an upper tubular extension communicating with the upper end of said tubular member extending snugly through said aperture beyond said top wall, said tubular member and lower and upper extensions combining to define a fluent material passageway communicating between the interior and exterior of said enclosed container for discharge of contents therefrom, said upper tubular extension being foldable to overlie said top wall and crimp itself closed to effectively seal said passageway, and retaining means on said top wall removably retaining said upper tubular extension in its folded closed condition, said retaining means comprising a cap removably engageable over said top wall and folded upper tubular extension.

2. A measuring and dispensing device according to claim 1, said bottom wall having a generally chordal trough receiving fluent contents, said lower tubular extension being located in said trough for receiving fluid contents therefrom.

3. A measuring and dispensing device for fluent material, said device comprising a bottom wall, a side wall extending peripherally about and upstanding from said bottom wall, a top wall extending across said side wall, said top and bottom walls combining with said side wall to define an enclosed container, said top wall having a through aperture adjacent to one region of said side wall, a tubular member extending internally of said container along said one side wall region between said bottom and top walls, a lower tube extension communicating with the lower end of said tubular member and extending along said bottom wall terminating in an open end spaced from said one side wall region, and an upper tubular extension communicating with the upper end of said tubular member extending snugly through said aperture beyond said top wall, said tubular member and lower and upper extensions combining to define a fluent material passageway communicating between the interior and exterior of said enclosed container for discharge of contents therefrom, said lower tubular extension including a bellows for smooth mergence with the lower end of said tubular member.

4. A measuring and dispensing device for fluent material, said device comprising a bottom wall, a side wall extending peripherally about and upstanding from said bottom wall, a top wall extending across said side wall, said top and bottom walls combining with said side wall to define an enclosed container, said top wall having a through aperture adjacent to one region of said side wall, a tubular member extending internally of said container along said one side wall region between said bottom and top walls, a lower tube extension communicating with the lower end of said tubular member and extending along said bottom wall terminating in an open end spaced from said one side wall region, and an upper tubular extension communicating with the upper end of said tubular member extending snugly through said aperture beyond said top wall, said tubular member and lower and upper extensions combining to define a fluent material passageway communicating between the interior and exterior of said enclosed container for discharge of contents therefrom, said container being generally closed to exterior atmosphere except through said passageway, said bottom wall being removable from said side wall for filling of said container, said bottom wall having a generally chordal trough receiving fluent contents, said lower tubular extension being located in said trough for receiving fluent contents therefrom.

5. A measuring and dispensing device according to claim 4, said lower tubular extension including a bellows for smooth mergence with the lower end of said tubular member.

* * * * *